(12) United States Patent
Ikegami

(10) Patent No.: US 9,379,947 B2
(45) Date of Patent: Jun. 28, 2016

(54) MONITORING STATUS DISPLAY DEVICE, MONITORING STATUS DISPLAY METHOD AND MONITORING STATUS DISPLAY PROGRAM

(75) Inventor: Teruya Ikegami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 586 days.

(21) Appl. No.: 13/522,661

(22) PCT Filed: Dec. 20, 2010

(86) PCT No.: PCT/JP2010/072884
§ 371 (c)(1),
(2), (4) Date: Jul. 17, 2012

(87) PCT Pub. No.: WO2011/104983
PCT Pub. Date: Sep. 1, 2011

(65) Prior Publication Data
US 2012/0284278 A1 Nov. 8, 2012

(30) Foreign Application Priority Data
Feb. 26, 2010 (JP) ................................. 2010-043177

(51) Int. Cl.
*G06F 3/0481* (2013.01)
*G08B 19/00* (2006.01)
(Continued)

(52) U.S. Cl.
CPC .............. *H04L 41/22* (2013.01); *G06F 11/327* (2013.01); *G06Q 10/06* (2013.01); *H04L 41/069* (2013.01);
(Continued)

(58) Field of Classification Search
CPC .... G08B 19/00; G08B 21/182; G06F 3/0481; G06F 11/32; G06F 11/328; G06F 17/30321; H04L 67/36

USPC .................... 340/521, 522, 525; 700/27, 108; 702/182, 188; 707/741, E17.002; 709/223, 224; 714/47.1, 48; 715/736
See application file for complete search history.

(56) References Cited

U.S. PATENT DOCUMENTS 6,577,323 B1 * 6/2003 Jamieson et al. ............. 715/700
6,690,274 B1 * 2/2004 Bristol ............... G05B 23/0267
340/506

(Continued)

FOREIGN PATENT DOCUMENTS

| CN | 1361895 A | 7/2002 |
|---|---|---|
| CN | 1383514 A | 12/2002 |

(Continued)

OTHER PUBLICATIONS

Vandevenne, Lode, "Lode's Computer Graphics Tutorial: Flood Fill," 2004, retrieved on Nov. 28, 2014, from http://lodev.org/cgtutor/floodfill.html.*

(Continued)

Primary Examiner — Eric J Bycer
(74) Attorney, Agent, or Firm — Sughrue Mion, PLLC

(57) ABSTRACT

A monitoring status display device according to the present invention has: use index number determination means for, when displaying an arrangement of indices representing monitoring subjects in a predetermined display region, determining use index numbers that can be used with respect to importance levels set for the monitoring subjects, based on a ratio of the importance levels and a total number of the indices; importance level allocation means for determining an index to be allocated to each of the importance levels, based on the arrangement of the indices and the use index numbers set for the respective importance levels, in a manner that indices with the same importance level are disposed close to each other; and monitoring subject allocation means for allocating, substantially evenly to the indices, the monitoring subjects having an importance level same as that of the indices.

9 Claims, 14 Drawing Sheets

(51) Int. Cl.

| | | |
|---|---|---|
| *G08B 21/18* | (2006.01) | |
| *G06F 11/32* | (2006.01) | |
| *G06F 17/30* | (2006.01) | |
| *H04L 29/08* | (2006.01) | |
| *H04L 12/24* | (2006.01) | |
| *G06Q 10/06* | (2012.01) | |
| *H04L 12/26* | (2006.01) | |

(52) U.S. Cl.
CPC ........ *H04L 41/0609* (2013.01); *H04L 43/0817* (2013.01); *G06F 3/0481* (2013.01); *G06F 11/32* (2013.01); *G06F 11/328* (2013.01); *G06F 17/30321* (2013.01); *G08B 19/00* (2013.01); *G08B 21/182* (2013.01); *H04L 41/5009* (2013.01); *H04L 41/5032* (2013.01); *H04L 67/36* (2013.01)

(56) References Cited

U.S. PATENT DOCUMENTS

| | | | | |
|---|---|---|---|---|
| 7,000,193 | B1* | 2/2006 | Impink et al. | 715/771 |
| 7,603,458 | B1* | 10/2009 | Sexton et al. | 709/224 |
| 2001/0019328 | A1* | 9/2001 | Schwuttke | G06T 11/206 345/440 |
| 2003/0033402 | A1 | 2/2003 | Battat et al. | |
| 2003/0041264 | A1* | 2/2003 | Black | H04L 63/1425 726/4 |
| 2004/0133402 | A1* | 7/2004 | Iwasawa | G05B 23/0272 702/188 |
| 2004/0225637 | A1* | 11/2004 | Heinzel et al. | 707/1 |
| 2007/0219843 | A1* | 9/2007 | Keeler et al. | 705/9 |
| 2007/0268122 | A1* | 11/2007 | Kow et al. | 340/525 |
| 2009/0019348 | A1* | 1/2009 | King | 715/205 |
| 2009/0021814 | A1 | 1/2009 | Chen et al. | |
| 2009/0083676 | A1 | 3/2009 | Flanagan et al. | |
| 2009/0089421 | A1 | 4/2009 | Boehm et al. | |
| 2010/0109860 | A1* | 5/2010 | Williamson | G08B 29/22 340/508 |

FOREIGN PATENT DOCUMENTS

| | | |
|---|---|---|
| JP | 2000-089821 A | 3/2000 |
| JP | 2000-151667 A | 5/2000 |
| JP | 2004-151997 A | 5/2004 |
| WO | 01/54043 A1 | 7/2001 |

OTHER PUBLICATIONS

Integrated System Operation Management JP1 Version 9, Catalog by Hitachi, Ltd., Nov. 2009, p. 5-6, Monitoring "Searched on Feb. 10, 2010." URL:http://www.hitachi.co.jp/Prod/comp/soft1/download/catalog/ca/ca740.pdf.

"Service Level Management using Tivoli Service Level Advisor", Apr. 7, 2005, IBM Japan, p. 11, Customer Status Report (overall), "Searched on Feb. 10, 2010." URL:http://www-06.ibm.com/jp/services/itil/pdf/events/2005040704.pdf.

International Search Report of PCT/JP2010/072884 dated Mar. 22, 2011.

* cited by examiner

Fig. 3

| ALERT LEVEL | JUDGMENT CONDITION |
| --- | --- |
| VIOLATED (HIGH) | RESPONSE TIME; 60 SECONDS OR MORE, OR, OPERATING STATUS; STOPPED AGAINST OPERATION SCHEDULE |
| CAUTION (MEDIUM) | RESPONSE TIME; 30 SECONDS OR MORE AND LESS THAN 60 SECONDS |
| NORMAL (LOW) | RESPONSE TIME; LESS THAN 30 SECONDS |
| NORMAL STOP (LOWEST) | OPERATING STATUS; STOPPED IN ACCORDANCE WITH OPERATION SCHEDULE |

Fig. 4

| MONITORING SUBJECT ID | IMPORTANCE LEVEL |
|---|---|
| 00001 | HIGH |
| 00002 | HIGH |
| 00003 | HIGH |
| 00004 | HIGH |
| ⋮ | ⋮ |
| 00101 | MEDIUM |
| 00102 | MEDIUM |
| 00103 | MEDIUM |
| ⋮ | ⋮ |
| 01101 | LOW |
| 01102 | LOW |
| 01103 | LOW |
| ⋮ | ⋮ |

| MONITORING SUBJECT ID | RESPONSE TIME | OPERATING STATUS |
|---|---|---|
| 00001 | 15 SECONDS | IN OPERATION |
| 00002 | 60 SECONDS | IN OPERATION |
| 00003 | 12 SECONDS | IN OPERATION |
| 00004 | 25 SECONDS | STOPPED IN ACCORDANCE WITH OPERATION SCHEDULE |
| : | : | : |

Fig. 14

| | MONITORING SUBJECT ID | RESPONSE TIME | OPERATING STATUS | RELATED RESOURCE ID | |
|---|---|---|---|---|---|
| 911 | [!] 01101 | 30 SECONDS | IN OPERATION | HW01000 | ▲ |
| 912 | ⊗ 01102 | — | STOPPED AGAINST OPERATION SCHEDULE | HW01001 | |
| | 01110 | 19 SECONDS | IN OPERATION | HW01000 | |
| | 01120 | 18 SECONDS | IN OPERATION | HW01000 | |
| | 01125 | 07 SECONDS | IN OPERATION | HW01200 | |
| | : | : | | : | ▼ |

91

MONITORING STATUS DISPLAY DEVICE, MONITORING STATUS DISPLAY METHOD AND MONITORING STATUS DISPLAY PROGRAM

CROSS REFERENCE TO RELATED APPLICATIONS

This application is a National Stage of International Application No. PCT/JP2010/072884 filed Dec. 20, 2010, claiming priority based on Japanese Patent Application No. 2010-043177 filed Feb. 26, 2010, the contents of all of which are incorporated herein by reference in their entirety.

BACKGROUND

The present invention relates to a monitoring status display device, a monitoring status display method, and a monitoring status display program.

A system operation management needs to not only constantly monitor resources and the operating statuses of services, which are monitoring subjects, but also, in case of problems, promptly identify the problems and restore the system. The following Non-Patent Literature 1 discloses an integrated management tool for consolidating an entire system by collecting pieces of monitoring information from the monitoring subjects into a single integrated console. Non-Patent Literature 2 described below discloses a system operation monitoring tool that presents a list of monitored items defined based on SLA (Service Level Agreement).

Non-Patent Literature 1: Integrated System Operation Management JP1 Version 9, Catalog by Hitachi, Ltd., November 2009, P. 5-6, Monitoring, "Searched on Feb. 10, 2010."
URL:http://www.hitachi.co.jp/Prod/comp/soft1/downlad/catalog/ca/ca740.pdf Non-Patent Literature 2: "Service Level Management using Tivoli Service Level Advisor," Apr. 7, 2005, IBM Japan, P. 11, Customer Status Report (overall), "Searched on Feb. 10, 2010."
URL:http://www-06.ibm.com/jp/services/itil/pdf/events/2005040704.pdf The integrated management tool described in Non-Patent Literature 1 displays a group of monitoring subjects in the form of a tree structure. The system operation monitoring tool described in Non-Patent Literature 2 displays a table showing, for example, the monitored items, the times/dates of monitoring, and the presence/absence of problems.

Therefore, the more the monitoring subjects, the larger the tree and the table. This causes an administrator to repeatedly scroll or change the screen until the administrator can identify a monitoring subject having a problem. It requires a long time to identify a problem. The administrator might miss the problems while repeating such operation.

SUMMARY

The present invention was contrived in view of such circumstances, and an exemplary object thereof is to provide a monitoring status display device, method, and program that enable prompt and reliable identification of problems in a system.

A monitoring status display device according to the present invention has: use index number determination means for, when displaying an arrangement of a plurality of indices representing a plurality of monitoring subjects in a predetermined display region, determining use index numbers that can be used with respect to importance levels set for the plurality of monitoring subjects, based on a ratio of the importance levels and a total number of the plurality of indices; importance level allocation means for determining an index to be allocated to each of the importance levels, based on the arrangement of the plurality of indices and the use index numbers set for the respective importance levels, in a manner that indices with the same importance level are disposed close to each other; monitoring subject allocation means for allocating, substantially evenly to the indices, the monitoring subjects having an importance level same as that of the indices; display mode determination means for determining a display mode for displaying each of the indices, based on an alert level of each of the monitoring subjects allocated to the indices; and display control means for displaying the indices on the predetermined display region in accordance with the determined display modes.

A monitoring status display method according to the present invention is a monitoring status display method used in the monitoring status display device, the monitoring status display method having: a use index number determination step of, when displaying an arrangement of a plurality of indices representing a plurality of monitoring subjects in a predetermined display region, determining use index numbers that can be used with respect to importance levels set for the plurality of monitoring subjects, based on a ratio of the importance levels and a total number of the plurality of indices; an importance level allocation step of determining an index that is to be allocated to each of the importance levels, based on the arrangement of the plurality of indices and the use index numbers set for the respective importance levels, in a manner that indices with the same importance level are disposed close to each other; a monitoring subject allocation step of allocating, substantially evenly to the indices, the monitoring subjects having an importance level same as that of the indices; a display mode determination step of determining a display mode for displaying each of the indices, based on an alert level of each of the monitoring subjects allocated to the indices; and a display control step of displaying the indices on the predetermined display region in accordance with the determined display modes.

A monitoring status display program according to the present invention causes a computer to execute each of the steps included in the monitoring status display method. The program according to the present invention can be installed or loaded into the computer by downloading the program from a communication network or an optical disk such as a CD-ROM, a magnetic disk, a semiconductor memory, or other types of various recording media. The present invention can be established as a computer-readable recording medium in which the program is stored.

The present invention can achieve prompt and reliable identification of problems in a system, even when there exist a large number of monitoring subjects.

DESCRIPTION OF THE DRAWINGS

FIG. 3 is a diagram showing an example of a data configuration of an alert level table;

FIG. 4 is a diagram showing an example of a data configuration of a monitoring subject information table;

FIG. 13 is a diagram showing an example of a popup screen displayed when an index 60 shown in FIG. 7 is designated; and FIG. 14 is a diagram showing an example of a popup screen displayed when an index 80 shown in FIG. 11 is designated.

EXEMPLARY EMBODIMENT

Preferred exemplary embodiments of the monitoring status display device according to the present invention are described hereinafter with reference to the accompanying drawings.

First Embodiment

Figure 1:
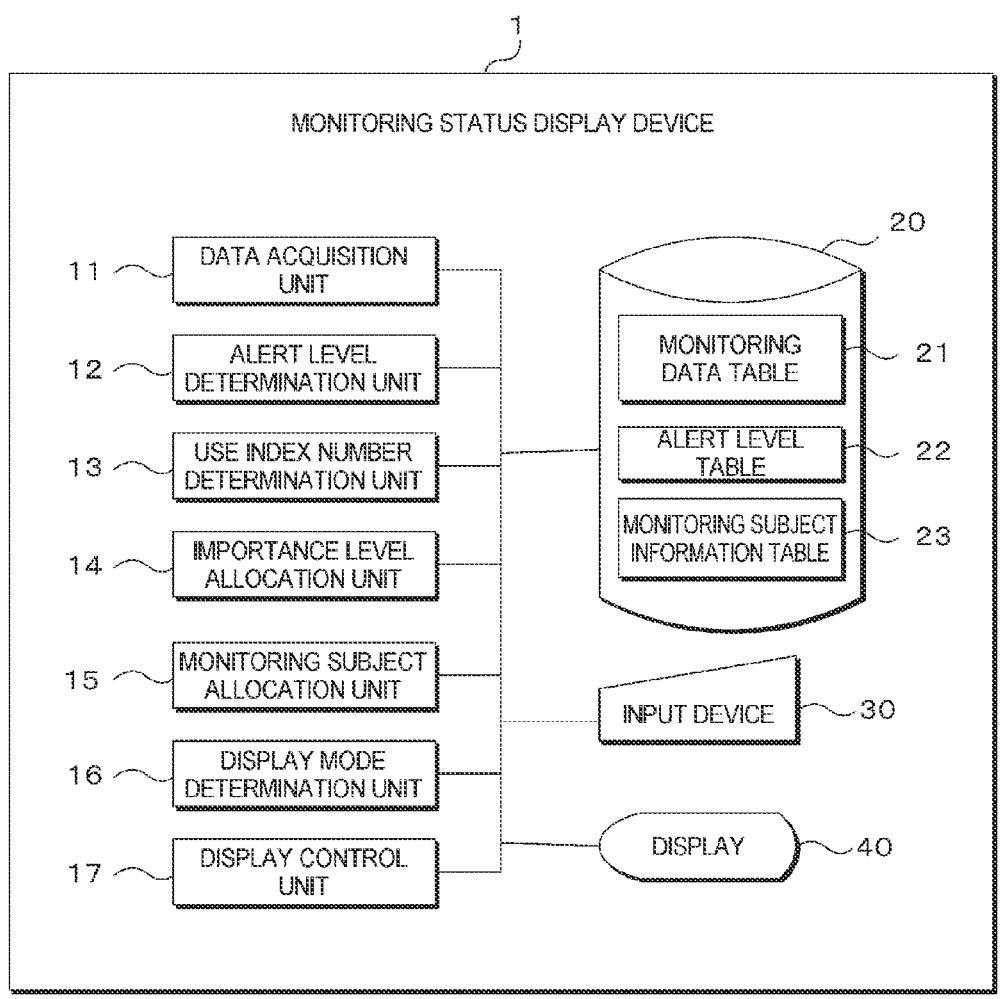
FIG. 1 is a block diagram showing an example of a configuration of a monitoring status display device according to a first embodiment.

First, functional configurations of a monitoring status display device according to a first embodiment are described with reference to FIG. 1. A monitoring status display device 1 functionally has, for example, a data acquisition unit (data acquisition means) 11, an alert level determination unit (alert level determination means) 12, a use index number determination unit (use index number determination means) 13, an importance level allocation unit (importance level allocation means) 14, a monitoring subject allocation unit (monitoring subject allocation means) 15, a display mode determination unit (display mode determination means) 16, and a display control unit (display control means) 17.

The monitoring status display device 1 is physically configured by, for example, a CPU, a memory (storage device) 20 for storing various tables, an input device 30, and a display (display device) 40. The storage device 20 includes, for example, a ROM for storing programs and data processed by the CPU, and a RAM used as a region for mainly performing a control process and other sorts of various tasks. The input device 30 includes, for example, a mouse and/or a keyboard. These elements are connected to one another by a bus. In the present embodiment, the CPU, for example, is caused to execute the programs stored in the ROM to perform processes by using data input from the input device 30 or data expanded in the RAM. In this manner, the functions of the elements configuring the monitoring status display device 1 can be realized.

The data acquisition unit 11 acquires monitoring data of a plurality of monitoring subjects, and stores the acquired monitoring data in a monitoring data table (monitoring data storage means) 21. Examples of the monitoring subjects include resources such as hardware, middleware, and networks configuring a system, and applications for realizing services provided to a user. Examples of the monitoring data include response time data, operating status data, crisis judgment data, and transaction number data obtained from the users. It should be noted that the monitoring data may be acquired directly from each of the monitoring subjects or through a monitoring device or the like that collects the monitoring data.

An example of a data configuration of the monitoring data table 21 is described with reference to FIG. 2. The monitoring data table (monitoring data storage means) 21 has data items such as, for example, a monitoring subject ID item, a response time item, and an operating status item. Identification information for uniquely identifying a monitoring subject is stored in the monitoring subject ID item. The length of time required to obtain a response from each monitoring subject is stored in the response time item. Operating status data of the monitoring subjects are stored in the operating status item. Examples of the operating status data include "in operation," "stopped in accordance with operation schedule," "stopped against operation schedule," and the like.

Returning to FIG. 1, the alert level determination unit 12 determines an alert level of each monitoring subject on the basis of the contents of the monitoring data acquired from each monitoring subject. The alert level represents a degree (level) of an alert about the state of each monitoring subject. In the present embodiment, the alert level of each monitoring subject is determined, for example, based on the contents of the monitoring data stored in the monitoring data table 21, by referring to an alert level table 22 shown in FIG. 3.

The alert level table (alert level storage means) 22 shown in FIG. 3 has data items such as, for example, an alert level item and a judgment condition item. The information indicating a degree (level) of alert is stored in the alert level item. Four levels of, for example, "violated (high)," "caution (medium)," "normal (low)," and "normal stop (lowest)" are registered in the alert level item. The following judgment conditions are stored in the judgment condition item: "response time is 60 seconds or more, or operating status shows 'stopped against operation schedule'," based on which the alert level indicates "violated" (high); "response time is 30 seconds or more and less than 60 seconds," based on which the alert level indicates "caution" (medium); "response time is less than 30 seconds," based on which the alert level indicates "normal" (low); and "operating status shows 'stopped in accordance with operation schedule'," based on which the alert level indicates "normal stop" (lowest).

Figure 2:
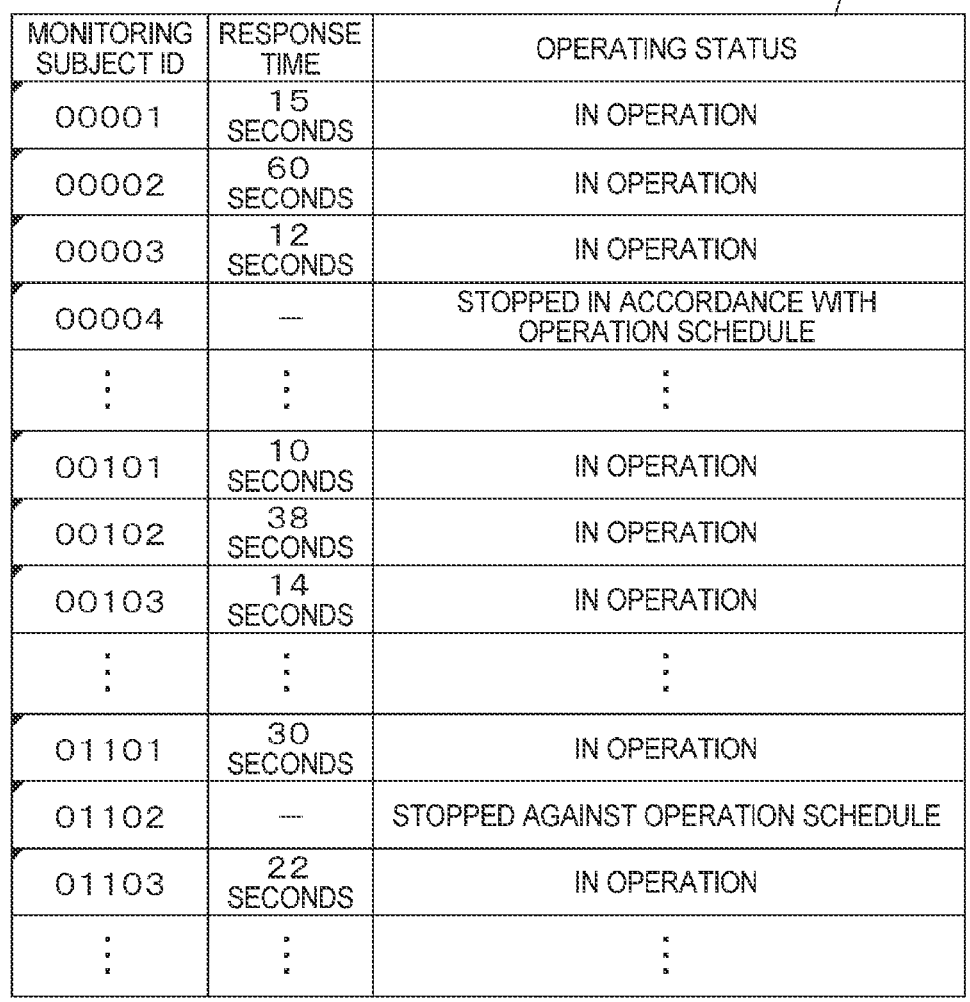
FIG. 2 is a diagram showing an example of a data configuration of a monitoring data table.

In the examples shown in FIGS. 2 and 3, the alert level determination unit 12 refers to the judgment condition item of the alert level table 22 by using the response time data and operating status data acquired from each monitoring subject, and extracts from the alert level table 22 the alert levels corresponding to the judgment conditions to which the response time data and operating status data apply. The alert level determination unit 12 determines the alert levels of the monitoring subjects in this manner.

For instance, the response time of the monitoring subject having "00001" as the monitoring subject ID is "15 seconds," as shown in FIG. 2. The alert level of this monitoring subject is, therefore, determined as "normal (low)." The response time of the monitoring subject having "00002" as the monitoring subject ID is "60 seconds." The alert level of this monitoring subject is, therefore, determined as "violated (high)." The response time of the monitoring subject having "00102" as the monitoring subject ID is "38 seconds." The alert level of this monitoring subject is, therefore, determined as "caution (medium)." The operating status of the monitoring subject having "01102" as the monitoring subject ID shows "stopped against operation schedule." The alert level of this monitoring subject is, therefore, determined as "violated (high)."

Note that the alert levels are not necessary those four levels described above; thus, a plurality of any levels can be provided as the alert levels. Furthermore, the conditions for determining the alert levels are not necessarily those conditions described above. For example, other monitoring data may be used to set the conditions. Alternatively, asset values of the resources and applications, service values, and other evaluation values may be set as the conditions.

The use index number determination unit 13 determines index numbers (referred to as "use index numbers" hereinafter) that can be used with respect to the importance levels of the monitoring subjects, when displaying indices (objects) representing the monitoring subjects in a predetermined display region. The importance levels of the monitoring subjects are used when monitoring the monitoring subjects. The importance levels are set with respect to the monitoring subjects and stored in a monitoring subject information table (monitoring subject information storage means) 23. FIG. 4 shows an example of a data configuration of the monitoring subject information table 23 storing information related to the monitoring subjects. The monitoring subject information table 23 has data items such as, for example, a monitoring subject ID item and an importance level item. Identification information for uniquely identifying a monitoring subject is stored in the monitoring subject ID item. Values such as, for example, "high," "medium," and "low" are stored as the importance levels used when monitoring the monitoring subjects. The importance levels are not necessary these three levels; thus, a plurality of any levels can be provided as the importance levels.

Figure 5:
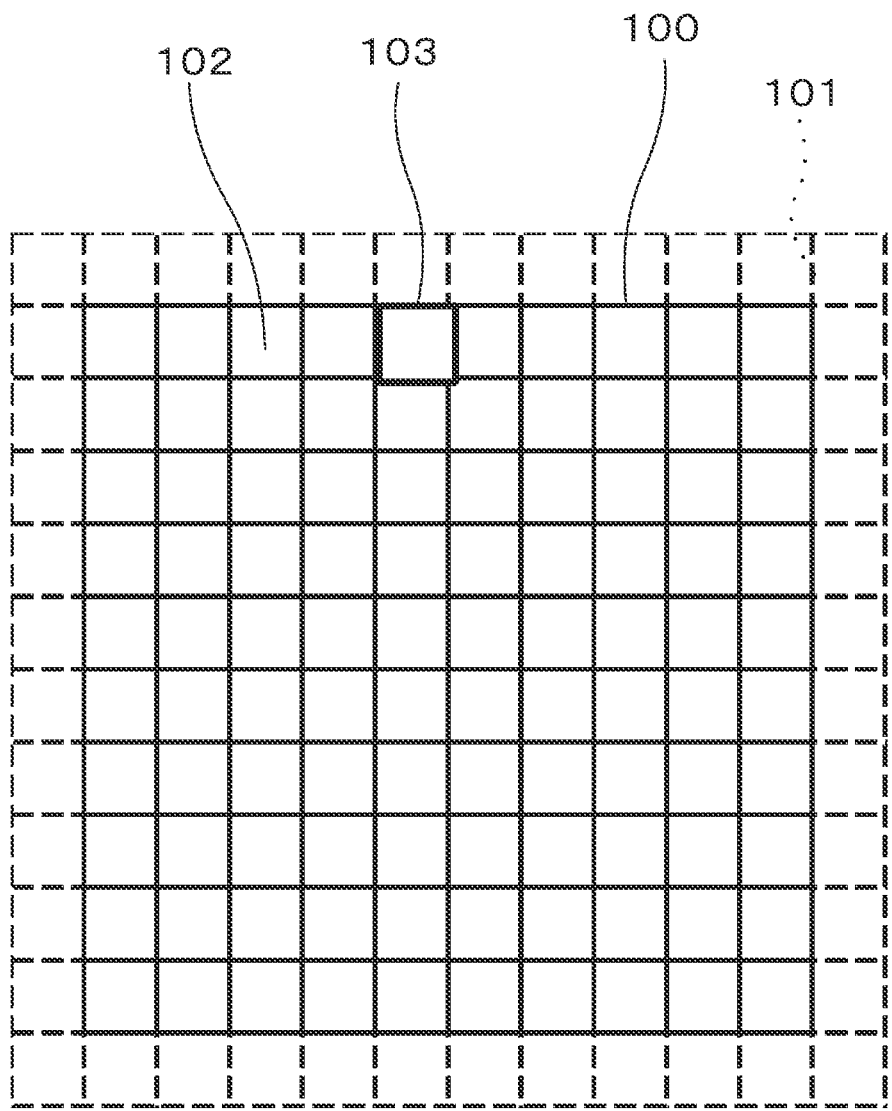
FIG. 5 is a diagram for explaining an example of indices displayed within a display region.

The indices, on the other hand, are displayed in the display region in order to express the monitoring subjects. FIG. 5 is a diagram for explaining the indices displayed within the display region. As shown in the diagram, an index 103 is displayed on each segmented region 102 that is obtained by dividing a predetermined display region 100 into a mesh by lines 101 (a single index 103 is shown in the diagram for explanatory convenience, but indices can be displayed on the segmented regions 102 respectively). The display region 100 is a fixed display region displayed fixedly on the display 40. The size of the display region or a total number of the indices displayed on the display region is set according to the display capability of the display 40.

The use index number determination unit 13 determines use index numbers with respect to the importance levels on the basis of the ratio of the importance levels (e.g., "low," "medium," and "high") of the monitoring subjects (referred to as "importance level ratio" hereinafter) and the total number of the indices displayed on the display region (referred to as "the displayed index total" hereinafter). The importance level ratio of the monitoring subjects is calculated with reference to the importance levels of the monitoring subjects in the monitoring subject information table 23. When, for example, the display region is divided into columns and rows, the displayed index total is calculated from the number of columns and the number of rows. The use index number determination unit 13 determines the use index number corresponding to each importance level by, for example, adding the rate (percentage) of each importance level of the total importance level to the displayed index total.

Suppose that the importance level ratio is 9500:450:50 (low:medium:high) and that the displayed index total is 100 (10 (columns)×10 (rows)=100). In this case, the use index number of each importance level can be calculated as follows:

Importance level(low)=100×(9500/10000)=95

Importance level(medium)=100×(450/10000)=4.5

Importance level(high)=100×(50/10000)=0.5

When the obtained values are less than 1 as a result of the calculations shown above, the values of such importance levels are rounded off to 1. When the obtained values have fractions, the values of such importance levels are sequentially rounded, starting from the smallest value. Finally, the largest obtained value is adjusted in a manner that the total of the obtained values matches the displayed index total. In the calculations shown above, the value of the importance level (high) is 0.5, less than 1, and is therefore rounded off to 1. The value of the importance level (medium) is 4.5 with a fraction and is therefore rounded off to the whole number of 5. Finally, the value of the importance level (low) is 95. When this value is used as it is, the total of the importance levels becomes 101, exceeding 100, the index total. Therefore, the difference therebetween is subtracted from the value of the importance level (low) to obtain a value of 94. As a result, at least one use index number can be allocated to each importance level, even when the ratio of a certain importance level is extremely low. In such a case, the use index numbers of the other importance levels are adjusted in a manner that the total of the use index numbers of all of the importance levels matches the displayed index total. When determining the use index numbers of the importance levels, not only the method described above but also a design-based method can be appropriately adopted. For example, the ratio may be raised to the second power, or each importance level may be weighted.

The importance level allocation unit 14 allocates the importance levels to the indices displayed on the display region, respectively (connects the importance levels to the indices). Allocation of the importance levels is performed based on the use index numbers of the respective importance levels that are determined by the use index number determination means 13, in a manner that the indices with the same importance level are disposed close to each other on the display region. For example, a reference axis (see the reference numeral 50 in FIG. 6) is set on the display region shown in FIG. 5. Then, the importance levels are allocated to the indices along this reference axis. Allocating the importance levels to the indices means, for example, managing the correspondence relationship between the identification information (e.g., an index ID or coordinate) for uniquely identifying an index and importance level information (e.g., an importance level ID or importance level name) indicating each importance level.

The allocation of the importance levels performed by the importance level allocation unit 14 is described with reference to FIG. 6. In the following description, the indices are disposed in all of the segmented regions in the display region. The importance level allocation unit 14 sets the reference axis 50 in a predetermined direction A on the display region. Furthermore, a starting position 51 is set on a predetermined segmented region. The starting position 51 is set in any segmented region located at, for example, an end of the display region. The importance level allocation unit 14 sets a target importance level to an index on the starting position 51. The indices to which the importance levels are allocated are referred hereinafter as "allocated indices."

Subsequently, the importance level allocation unit 14 searches for an index to which an importance level is not allocated (referred to as "unallocated index"), in a region from the starting position 51 in a direction B perpendicular to the reference axis 50. When the unallocated index exists, the target importance level is allocated to the unallocated index. When a plurality of unallocated indices exist in the region along the perpendicular direction B, the target importance level is allocated to these unallocated indices. When there are no unallocated indices along the perpendicular direction B (when all of the indices are the allocated indices, or when there are no indices), the search area is moved by a predetermined distance in the axial direction A of the reference axis. The predetermined distance can be set at, for example, $\sqrt{2}/2x$, where "x" is the length of each side of an index. The importance level allocation unit 14 then searches for an unallocated index existing in a region in the perpendicular direction B, the region starting from the points obtained after moving the search area by the predetermined distance. When the unallocated index exists, the target importance level is allocated to this unallocated index. When there are no unallocated indices, the search area is moved by a predetermined distance in the axial direction A of the reference axis. The importance level allocation unit 14 then searches for an unallocated index existing in a region in the perpendicular direction B, the region starting from the points obtained after moving the search area by the predetermined distance. Until the target importance level is allocated completely to the indices, the number of which corresponds to the use index number, the importance level allocation unit 14 repeats the process of searching for the unallocated index and allocating the target importance level to the unallocated index. Once this allocation for the use index number is completed, the next importance level is allocated as the target importance level in the same manner described above.

Figure 6:
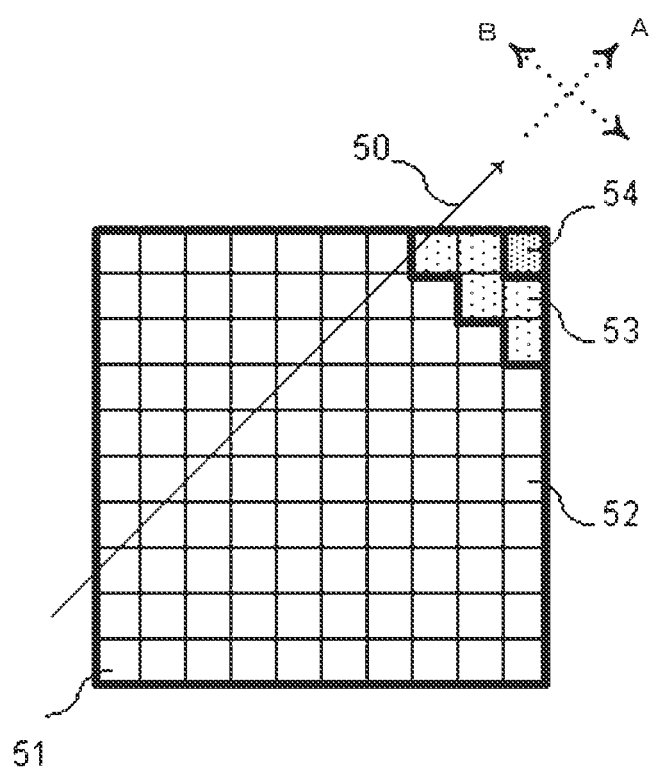
FIG. 6 is a diagram for explaining an example of indices to which importance levels are allocated.

As shown in FIG. 6, the importance level (low) is allocated to an index group 52 (the use index number is 94), the importance level (medium) to an index group 53 (the use index number is 5), and the importance level (high) to an index 54 (the use index number is 1). In this manner, the importance levels (high, medium, and low) are allocated to all of the indices displayed in the display region, wherein the indices with the same importance level are disposed adjacent to each other and fixedly displayed. For explanatory convenience, the lower the importance level, the lower the color density of each index.

The monitoring subject allocation unit 15 allocates the monitoring subjects to the indices to which the importance levels are allocated by the importance level allocation unit 14 (connects the importance levels to the indices). Specifically, the monitoring subject allocation unit 15 allocates, subsequently evenly to the indices to which the same importance level is allocated, the monitoring subjects having an importance level same as that of the indices. One or a plurality of monitoring subjects can be associated with one index. When the same importance level is allocated to a plurality of indices, a plurality of monitoring subjects having the same importance level are allocated substantially evenly to the plurality of indices. Allocation of the monitoring subjects to the indices is performed by, for example, associating the identification information (e.g., an index ID or coordinate) for uniquely identifying an index with a monitoring subject ID. In this manner, each monitoring subject is allocated to each index.

As shown in FIG. 6, the monitoring subjects with the importance level (low) are allocated substantially evenly to the index group 52. The monitoring subjects with the importance level (medium) are allocated substantially evenly to the index group 53. All of the monitoring subjects with the importance level (high) are allocated to the index 54.

The display mode determination unit 16 determines display modes for displaying the indices on the basis of the monitoring subjects allocated to the indices. As a method for determining the display modes based on the monitoring subjects, the display modes can be set appropriately in accordance with specifications; however, the display modes can be determined for the monitoring subjects allocated to the indices by, for example, referring to the alert levels determined by the alert level determination means 12. The display mode determination unit 16 determines the display modes using, for example, a table in which the alert levels and the display modes are associated with each other. Colors that are different depending on the alert levels (red for the "high" alert level, yellow for the "medium" alert level, and green for the "low" alert level), for example, can be set as the display modes. When a plurality of monitoring subjects are allocated to one index, an alert level coherent with a predetermined condition is selected from among the alert levels of the plurality of monitoring subjects, and a display mode corresponding to the selected alert level is set as a display mode of the abovementioned index. The predetermined condition can be set, for example, in a manner that the highest alert level is selected.

Figure 7:
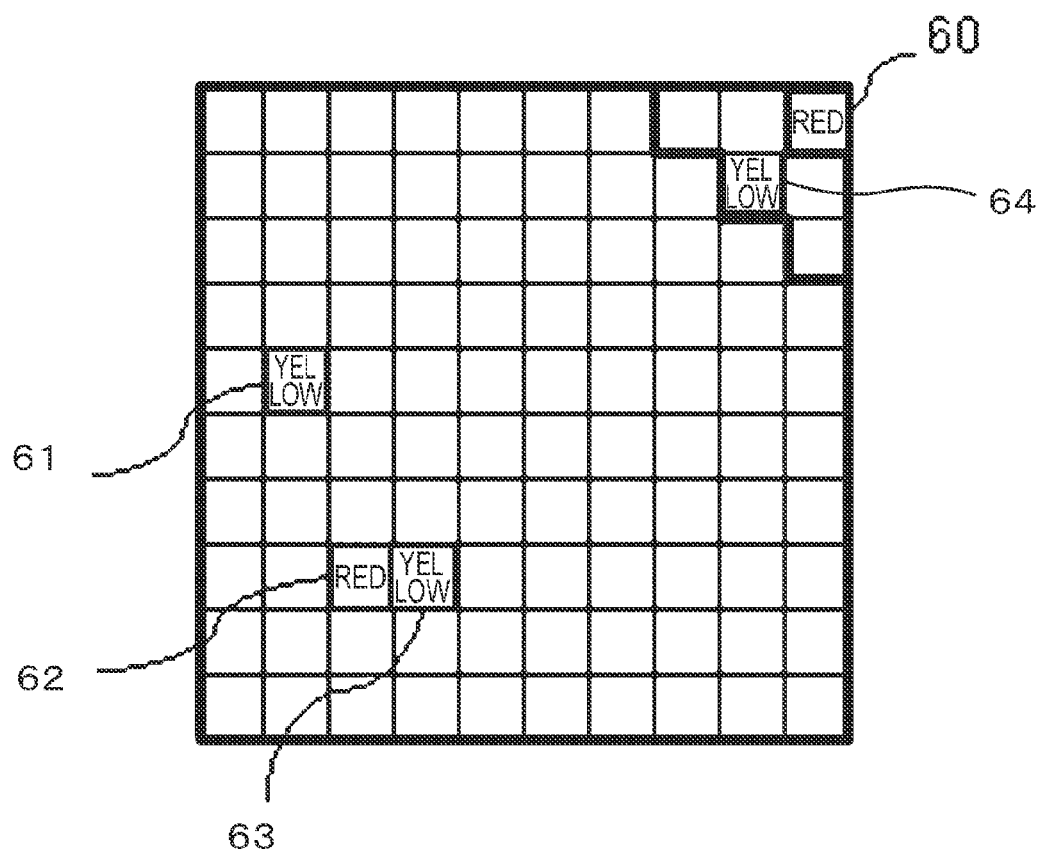
FIG. 7 is a diagram showing an example of a monitoring status display screen.

The display control unit 17 displays the indices on the display region in the display modes determined by the display mode determination unit 16. FIG. 7 is a diagram showing an example of a monitoring status display screen. For explanatory convenience, each of the colors is expressed using a letter, and no colors are used for indices other than indices 60 to 64.

For example, when the monitoring subjects "00001," "00002," "00003," and "00004" that have the alert level (low), alert level (medium), alert level (low), and alert level (high) respectively are allocated to the index 60 to which the importance level (high) is allocated, this index is displayed in "red" in accordance with the highest alert level (high).

When the monitoring subjects "00101," "00102," and "00103" that have the alert level (low), alert level (medium), and alert level (low) respectively are allocated to the index 64 to which the importance level (medium) is allocated, this index is displayed in "yellow" in accordance with the highest alert level (medium).

When the monitoring subjects "01101," "01102," and "01103" are allocated to the indices 61, 62 and 63 to which the importance level (low) is allocated, the alert levels of the monitoring subjects "01101," "01102," and "01103" are obtained as medium, high, and medium, respectively. Although other monitoring subjects are allocated to the indices 61, 62, and 63, the alert levels of the monitoring subjects "01101," "01102," and "01103" are the highest. Therefore, the index 61 is displayed in "yellow" in accordance with the alert level (medium). The index 62 is displayed in "red" in accordance with the alert level (high). The index 63 is displayed in "yellow" in accordance with the alert level (medium).

The user who uses the example shown in FIG. 7 can easily understand that the monitoring subjects corresponding to the importance level (high) have at least one problem, and hence a high alert level, that the monitoring subjects corresponding to the importance level (medium) have at least one problem, and hence a medium alert level, and that the monitoring subjects corresponding to the importance level (low) have at least three problems, and hence one high alert level and two medium alert levels. In addition, because the indices representing the monitoring subjects are displayed in the fixed display region, the user can instantly identify the problems, without scrolling or change the screen.

The display mode determination unit 16 may determine the display modes of the indices by using the alert levels of the monitoring subjects and the importance levels of these monitoring subjects (the importance levels allocated to the indices). For example, the display mode determination unit 16 can determine the colors of the indices in accordance with the alert levels, as well as the tones of the indices in accordance with the importance levels.

Operations for displaying the monitoring statuses are described next with reference to FIG. 8. The process steps shown in the flowchart of FIG. 8 can be executed in a different order or in parallel, without causing a discrepancy in the contents of the processes. Another step may be added between the steps. Whereas the term "step" that is described as a single step for explanatory convenience can be divided into a plurality of steps, a process that is divided into a plurality of steps for explanatory convenience can be comprehended as a single step.

Figure 8:
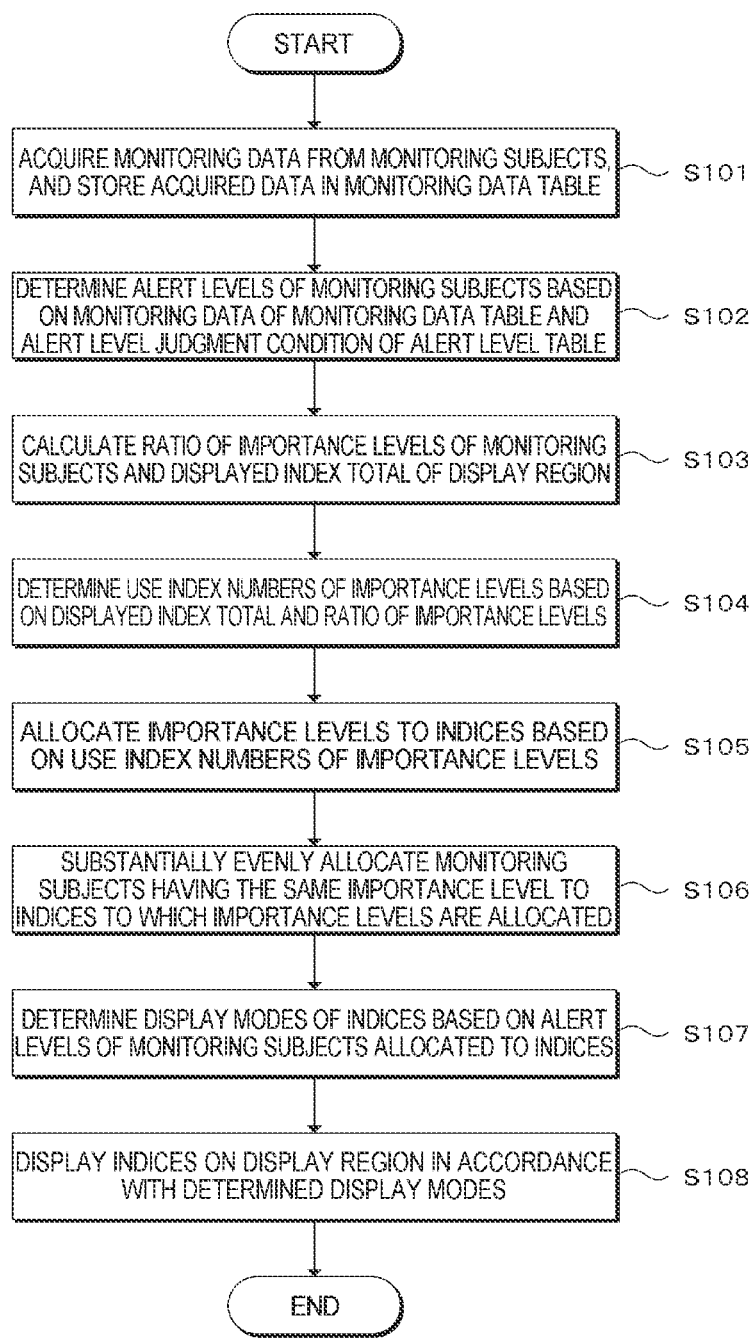
FIG. 8 is an example of a flowchart for explaining a monitoring status display process.

As shown in FIG. 8, first, the data acquisition unit 11 acquires monitoring data from the monitoring subjects and stores the acquired monitoring data in the monitoring data table 21 (step S101). The alert level determination unit 12 determines the alert levels of the monitoring subjects on the basis of the monitoring data stored in the monitoring data table 21, by referring to alert level judgment conditions of the alert level table 22 (S102).

The use index number determination unit 13 calculates the importance level ratio of the monitoring subjects with reference to the monitoring subject information table 23, and calculates the displayed index total on the display region based on the number of columns and the number of rows of the display region (S103). The use index number determination unit 13 then calculates the use index number of each importance level based on the importance level ratio of the monitoring subjects and the displayed index total (S104).

The importance level allocation unit 14 allocates the importance level to each of the indices based on the use index number determined for each importance level, in a manner that the indices with the same importance level are disposed close to each other in the display region (S105). More specifically, the monitoring subject allocation unit 15 sets the reference axis in the display region and sequentially allocates the importance levels to the indices along the reference axis, the number of indices corresponding to the use index numbers of the importance levels.

The monitoring subject allocation unit 15 allocates the monitoring subjects to the indices to which the importance levels are allocated (S106). More specifically, the monitoring subject allocation unit 15 allocates, substantially evenly to the indices to which the same importance level is allocated, the monitoring subjects having the importance level same as that of the indices.

The display mode determination unit 16 determines the display modes of the indices on the basis of the monitoring subjects allocated to the indices (S107). More specifically, the display mode determination unit 16 selects the higher alert level from among the alert levels of the monitoring subjects allocated to the indices, and then selects the display mode corresponding to the selected alert level.

The display control unit 17 displays the indices on the display region in accordance with the determined display modes (S108).

According to the monitoring status display device of the first embodiment described above, the importance levels are allocated to the indices on the basis of the use index number that is determined for each importance level based on the importance level ratio of the monitoring subjects and the displayed index total, and then the monitoring subjects with the same importance level are allocated substantially evenly to the indices. Therefore, a large number of monitoring subjects can be displayed on the fixed display region at once. For this reason, the user does not have to scroll or change the screen. Moreover, because the display modes of the indices to be displayed on the display region are determined based on the alert levels of the monitoring subjects that are connected to the indices, the user can see the presence/absence of a problem in each of the monitoring subjects in accordance with the importance levels of the monitoring subjects. Thus, even when there exist a large number of monitoring subjects when monitoring the system operation, the user can promptly and accurately understand the monitoring subjects having problems.

[Modification]

In the first embodiment described above, the monitoring subjects are allocated to the indices in accordance with the importance level ratio; however, the monitoring subjects may be allocated based on other criteria. For instance, when a region to which the monitoring subjects belong is set as a criterion for monitoring the monitoring subjects, the monitoring subjects may be allocated to the indices based on the ratio of the region.

Figure 9:
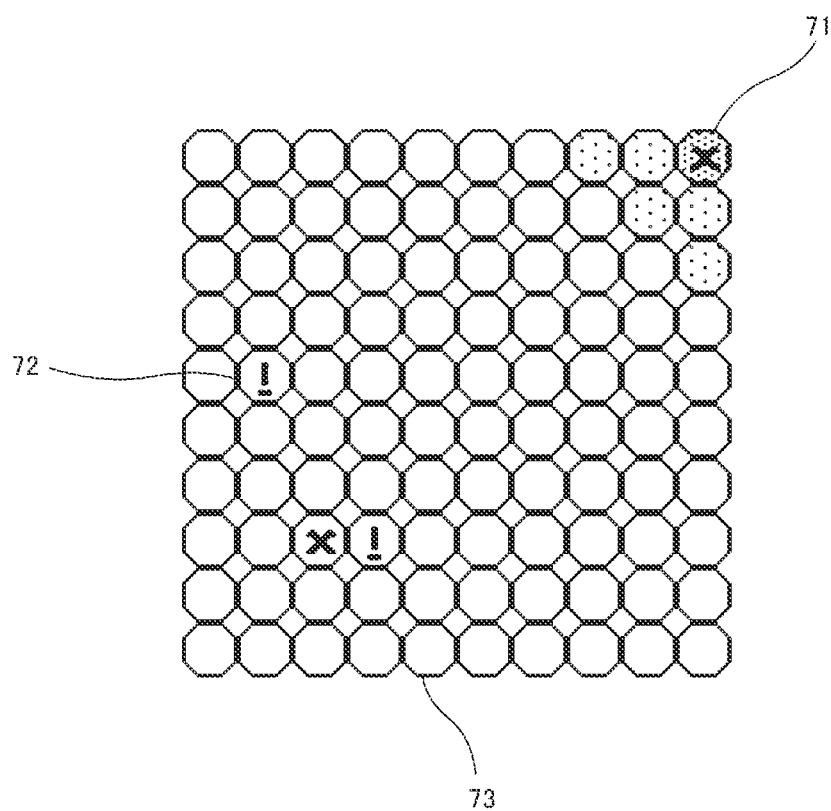
FIG. 9 is a diagram showing an example of a monitoring status display screen according to a modification.

The first embodiment has described that each index is in a rectangular shape and that each alert level is displayed by its color; however, the display mode of each index is not limited thereto. For example, each index may be in a circular shape (index 72), and the alert level of each index may be displayed in a symbol such as "x" (index 71) or "!" (index 72), as shown in FIG. 9.

The first embodiment has described a case where the axial direction of the reference axis is set along a diagonal line of the display region; however, the axial direction is not limited thereto and can be set along any line in accordance with the specifications. For example, the axial direction may be set long one of the sides of the display region. Moreover, the first embodiment has described that the starting position is provided at one end of the display region; however, the starting position can be provided anywhere, such as in the middle of the display region, depending on the design.

In the first embodiment described above, the display modes of the indices are determined based on the alert levels of the monitoring subjects. However, the display modes can also be determined based on, for example, the response times of the monitoring subjects or other values of the monitored items. The display modes can also be determined based on the percentages indicating the values of the alert levels of all of the monitoring subjects allocated to the indices, the average of the values of the monitored items of the monitoring subjects allocated to the indices, or dispersion of these values. When the monitoring data table 21 has time axis information of the monitoring data, the previous monitoring data of the monitoring subjects allocated to the indices may be referenced in order to determine the display modes of the monitoring subjects.

The first embodiment has also described a case in which a total of one hundred indices are displayed on the 10 (columns)×10 (rows) display region; however, the configurations of the display region and of the indices are not limited thereto, and other values can be set appropriately in accordance with the design. For example, a total of twenty indices may be displayed in a 1 (column)×20 (rows) display region.

Second Embodiment

Figure 10:
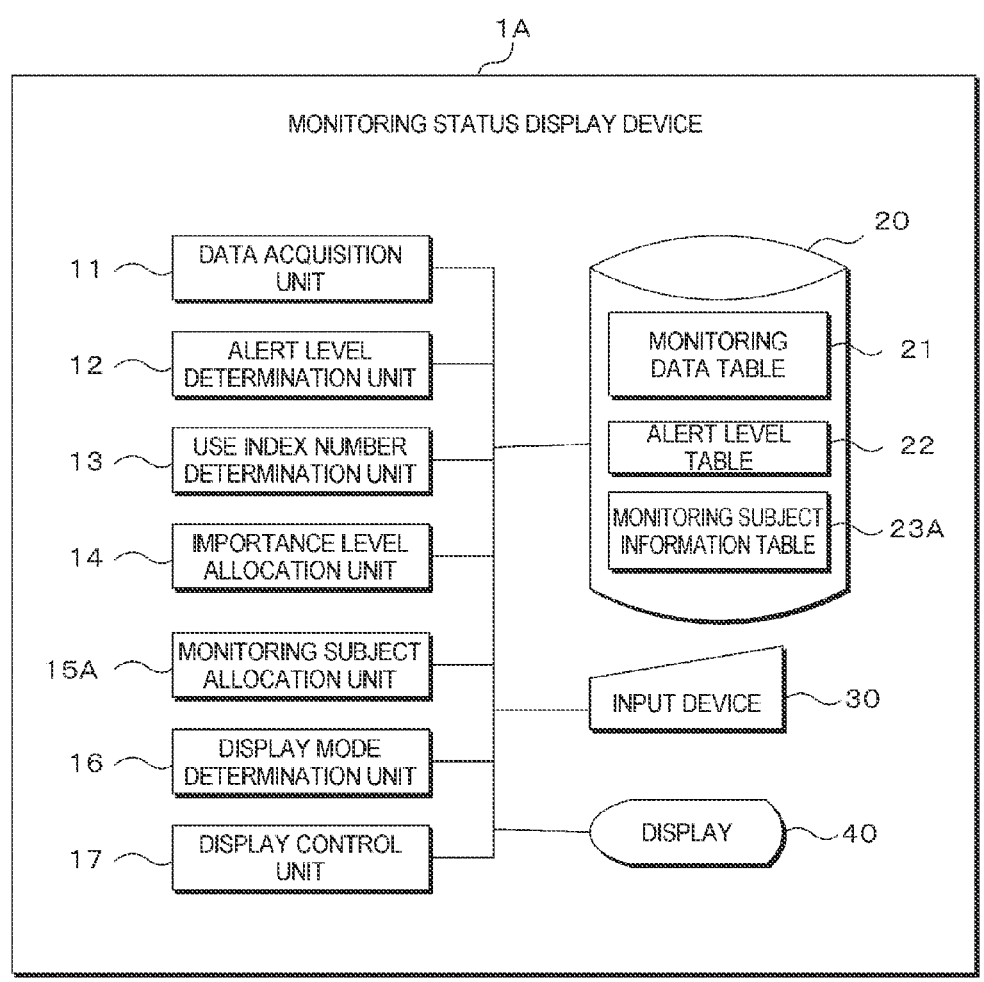
FIG. 10 is a block diagram showing an example of a configuration of a monitoring status display device according to a second embodiment.

Functional configurations of a monitoring status display device according to a second embodiment are described with reference to FIG. 10. The difference between a monitoring status display device 1A of the second embodiment and the monitoring status display device 1 of the first embodiment is the data structures of the monitoring subject allocation units (15A, 15) and the monitoring subject information tables (23A, 23). The rest of the configurations of the monitoring status display device 1A of the second embodiment are the same as those of the monitoring status display device 1 of the first embodiment. Thus, the same reference numerals are used to indicate the same components, and consequently the overlapping explanations are omitted accordingly. The differences between the first embodiment and the second embodiment are mainly described hereinafter.

Figure 11:
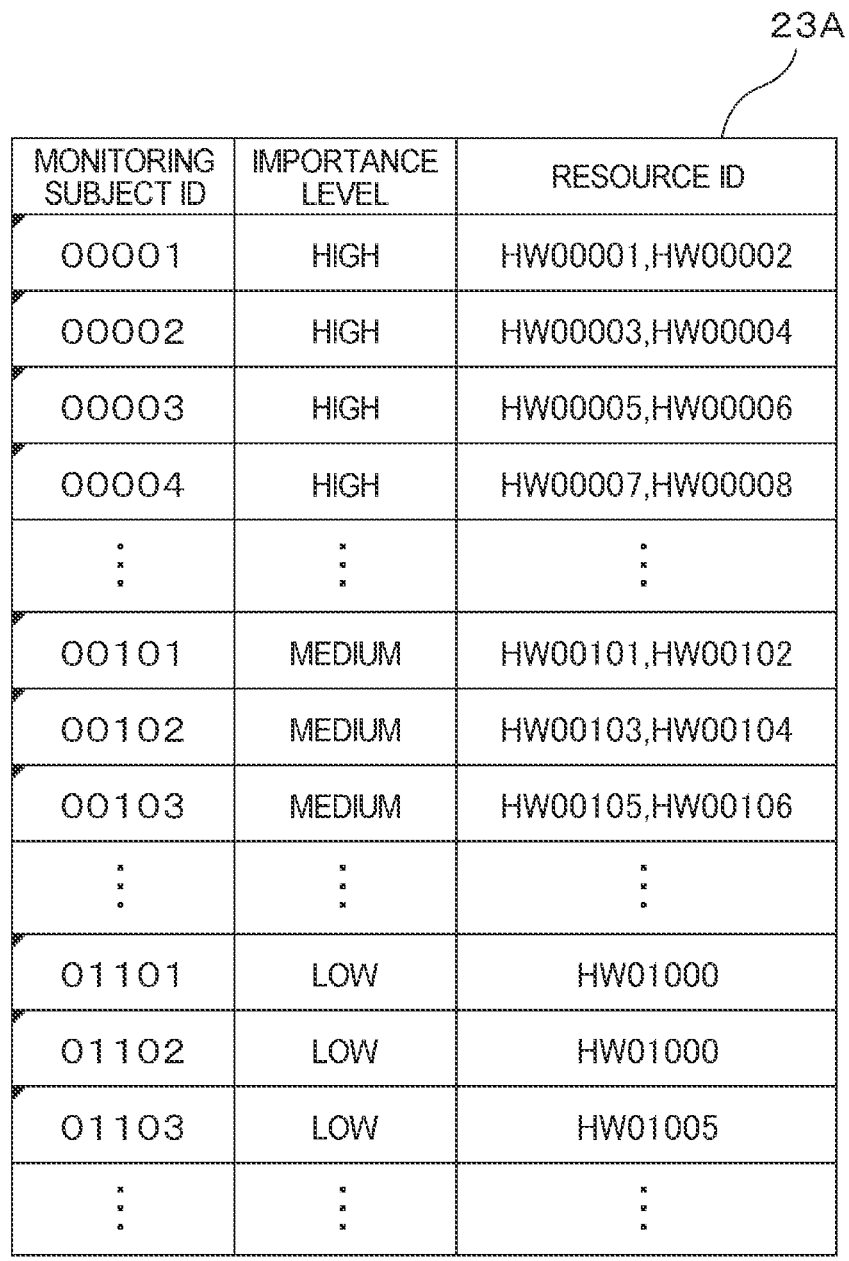
FIG. 11 is a diagram showing an example of a data configuration of the monitoring subject information table according to the second embodiment.

As shown in FIG. 11, a monitoring subject information data table 23A of the second embodiment has a monitoring subject ID item, alert level item, and resource ID item. Resource IDs for uniquely identifying resources related to the monitoring subjects are stored in the resource ID item. When the monitoring subjects are applications for realizing services, examples of the resources include hardware, middleware, and networks that provide the applications.

For instance, the resource ID of the monitoring subject having "00001" as the monitoring subject ID is "HW00001, HW00002," and the resource ID of the monitoring subject having "00002" as the monitoring subject ID is "HW00003, HW00004," as shown in FIG. 11, which means that these services are provided by these different resources. The resource IDs of the monitoring subjects having "01101" and "01102" as the monitoring subject IDs are "HW01000," which means that these services are provided by the same resource.

A monitoring subject allocation unit 15A of the second embodiment has the following functions in addition to the functions of the monitoring subject allocation unit 13 described in the first embodiment. The monitoring subject allocation unit 13A creates a group of "related monitoring subjects" by grouping the monitoring subjects whose resource IDs overlap partially or entirely. For example, the monitoring subjects having "01101" and "01102" as the monitoring subject IDs are provided by the same resource, as shown in FIG. 11. Therefore, the monitoring subject allocation unit 15A forms the monitoring subjects "01101" and "01102" into the group of related monitoring subjects.

The monitoring subject allocation unit 15A also functions to identify the monitoring subjects that have the same importance level and have the alert levels satisfying a predetermined condition (e.g., the alert levels are medium or higher). Specifically, the monitoring subject allocation unit 15A identifies the monitoring subjects having the same importance level (referred to as "same importance level monitoring subjects" hereinafter) with reference to the monitoring subject information table 23A, and identifies, from the identified same importance level monitoring subjects, monitoring subjects that have "medium" or higher alert levels (referred to as "important monitoring subjects" hereinafter) with reference to the alert level table 22. The monitoring subject allocation unit 15A then determines whether the identified important monitoring subjects include monitoring subjects that have the same resource, which are, in other words, the monitoring subjects corresponding to the related monitoring subjects.

When the important monitoring subjects include the monitoring subjects corresponding to the related monitoring subjects (referred to as "related important monitoring subjects" hereinafter), the monitoring subject allocation unit 15A changes the existing allocations or creates new allocations so that the related important monitoring subjects are allocated to the same index. However, when the important monitoring subjects include the monitoring subjects that do not correspond to the related monitoring subjects (referred to as "unrelated important monitoring subjects" hereinafter), the monitoring subject allocation unit 15A changes the existing allocations or creates new allocations so that these unrelated important monitoring subjects are allocated to different indices, as long as there exist indices.

Based on the monitoring subjects allocated to the indices, the display mode determination unit 16 redetermines the display modes of the indices whose allocations are changed by the monitoring subject allocation means 15A. The display control unit 17 displays the indices on the display region based on the redetermined display modes.

Figure 12:
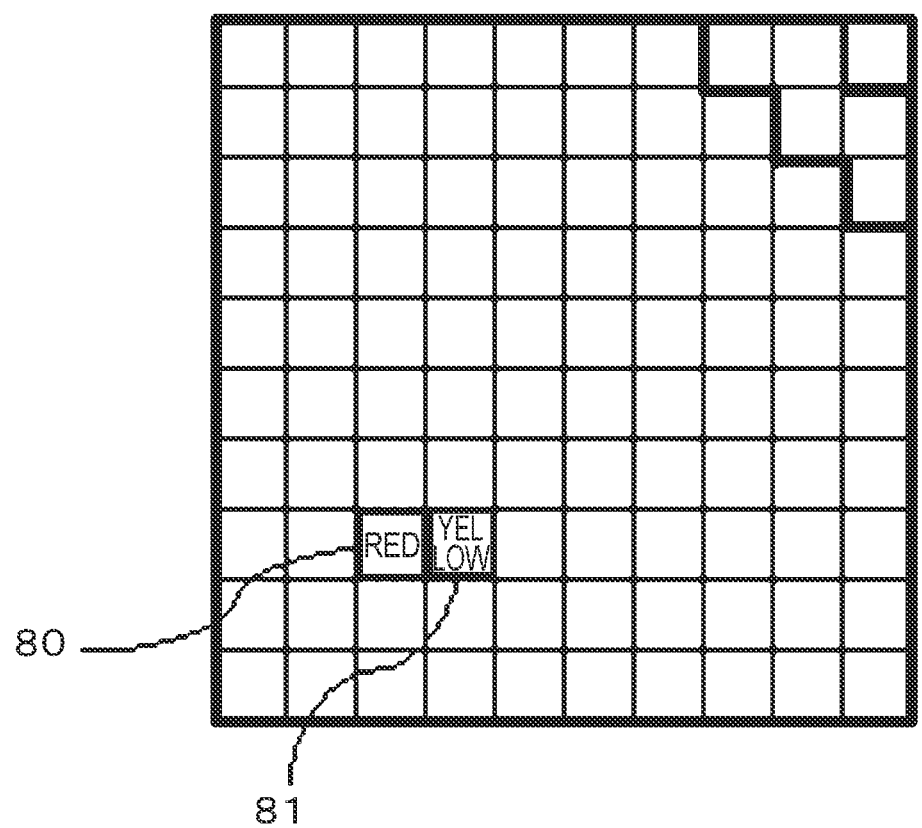
FIG. 12 is a diagram showing an example of a monitoring status display screen according to the second embodiment.

A monitoring status display screen shown in FIG. 12 is now described with reference to the monitoring status display screen shown in FIG. 7 of the first embodiment. Note that FIG. 12 does not show the colors of the indices other than indices 80 and 81, for explanatory convenience.

For example, when the monitoring subjects "01101," "01102," and "01103" having the same importance level (low) are allocated to the indices 61, 62, and 63 in FIG. 7, the alert levels of the monitoring subjects "01101," "01102," and "01103" are medium, high, and medium, respectively. Therefore, the monitoring subjects "01101," "01102," and "01103" correspond to the important monitoring subjects. Because the resource IDs of the monitoring subjects "01101" and "01102" are "HW01000," the monitoring subjects "01101" and "01102" correspond to the related important monitoring subjects. On the other hand, the resource ID of the monitoring subject "01103" is "HW01010," which is different from those of the other monitoring subjects. Therefore, the monitoring subject "01103" corresponds to the unrelated important monitoring subject.

Therefore, for example, the allocation of the monitoring subject "01101" is changed—the monitoring subject "01101" that has been allocated to the index 61 is now allocated to the index 62, as with the monitoring subject "01102." On the other hand, the monitoring subject "01103" remains allocated to the index 63.

On the monitoring status display screen shown in FIG. 12, the index 80 is displayed in "red" in accordance with the highest alert level (high), and the index 81 is displayed in "yellow" in accordance with the highest alert level (medium). The user who refers to the monitoring status display screen shown in FIG. 12 can immediately understand that the monitoring subjects with the lowest importance level has at least two problems that are considered to be caused due to the different resources, and that one of the indices (index 80) has a high alert, while the other (index 81) has a medium alert.

As described above, the monitoring subject allocation unit 15A of the second embodiment forms the monitoring subject having the same resource into a group of related monitoring subjects and allocates these monitoring subjects to the same index. As a result, the user can understand the presence/absence of problems in the monitoring subjects by the resources that can be the cause of the problems. Therefore, even when there exist a large number of monitoring subjects when monitoring the system operation, the user can promptly and accurately understand the monitoring subjects having problems.

The condition for forming the monitoring subjects into the group of related monitoring subjects is not limited to the one described above (i.e., the resource IDs are the same), and any conditions can be set appropriately in accordance with the design. For example, when a normal operation of a certain monitoring subject is based on the assumption that the other monitoring subjects are operated, the condition for operating the monitoring subjects may be set as the grouping condition in order to form these monitoring subjects into the group of related monitoring subjects. In addition, a combination of a plurality of conditions may be used, such as combinations of the resource IDs with the operation conditions.

Other Embodiments

Each of the embodiments described above is merely illustrative and does not preclude various modifications and technical application that are not illustrated in each of the embodiments. In other words, the present invention can be modified in various ways within the scope of the invention.

According to the monitoring status display device of each embodiment, when the user designates any of the indices displayed on the display region (when the user clicks on the designated index using a mouse pointer or the like, for example), the information on the monitoring subject allocated to the designated index (e.g., the monitoring subject ID, response time, operating status, resource ID) can be displayed on a popup screen. When the index displayed on the display region is designated, the display control unit 16 (16A) acquires, from the monitoring data table 21 and the monitoring subject information table 23 (23A), the information on the monitoring subject corresponding to the designated index, on the basis of the monitoring subject ID allocated to the designated index. This display control unit then displays a list of the acquired information on the popup screen.

FIGS. 13 and 14 are diagrams each showing an example of the popup screen. Specifically, when the index 60 (importance level (high)) shown in FIG. 7 is designated, the designated index 60 is displayed on a popup screen 90 shown in FIG. 13. The popup screen shown in FIG. 13 displays a list of information of each monitoring subject allocated to the designated index, the information including the monitoring subject ID, response time, and operating status, and also displays an icon 901 showing the alert level. The user can easily understand from the icon 91 showing the "high" alert level that a problem is developed in the monitoring subject "00002" and that the response time is 60 seconds, which is a specific problem.

When the index 80 shown in FIG. 12 is designated, the designated index 80 is displayed on a popup screen 91 shown in FIG. 14. The popup screen shown in FIG. 14 displays a list of information of each monitoring subject allocated to the designated index, the information including the monitoring subject ID, response time, operating status, and resource ID, and also displays icons showing the alert levels. From the icon 911 showing the "medium" alert level and the icon 912 showing the "high" alert level, the user can understand that a problem is developed in the monitoring subjects "01101" and "01102" provided by the same resource, that the response time is 22 seconds, which is a specific problem, and that the operating status shows "stopped against operation schedule."

Moreover, the display control unit 16 (16A) determines whether the monitoring subject that is allocated to the index designated by the user exceeds a prescribed number or not. When the monitoring subject does not exceed the prescribed number, detailed information of this monitoring subject may be listed on the popup screen. When, on the other hand, the monitoring subject exceeds the prescribed number, the display control unit 16 (16A) may allocate, substantially evenly, the monitoring subject to a plurality of indices, determine the display modes of the plurality of indices based on the alert level of the allocated monitoring subject, and display the indices on the display region in the determined display mode.

In the embodiment described above, the present invention is implemented by a single monitoring status display device; however, the present invention can be implemented by a plurality of monitoring status display devices. In this case, the functions provided in the monitoring status display device of the embodiments may be distributed a plurality of devices, and then this group of the plurality of devices may be caused to function as the monitoring status display device of the embodiment described above.

The embodiments, in part or in whole, can be illustrated as the following additional notes but are not limited thereto.

(Addition 1)

A monitoring status display device, comprising: use index number determination means for, when displaying an arrangement of a plurality of indices representing a plurality of monitoring subjects in a predetermined display region, determining use index numbers that can be used with respect to importance levels set for the plurality of monitoring subjects, based on a ratio of the importance levels and a total number of the plurality of indices; importance level allocation means for determining an index to be allocated to each of the importance levels, based on the arrangement of the plurality of indices and the use index numbers set for the respective importance levels, in a manner that indices with the same importance level are disposed close to each other; monitoring subject allocation means for allocating, substantially evenly to the indices, the monitoring subjects having an importance level same as that of the indices; display mode determination means for determining a display mode for displaying each of the indices, based on an alert level of each of the monitoring subjects allocated to the indices; and display control means for displaying the indices on the predetermined display region in accordance with the determined display modes.

(Addition 2)

The monitoring status display device according to the additional note 1, further comprising:
monitoring data acquisition means for acquiring monitoring data on each of the plurality of monitoring subjects; and
alert level determination means for determining an alert level of each of the monitoring subjects on the basis of contents of the monitoring data.

(Addition 3)

The monitoring status display device according to the additional note 1 or 2, wherein the importance level allocation means determines the index to be allocated to each of the importance levels, by executing a process of setting a reference axis on the predetermined display region, allocating a target importance level to each of the indices positioned along a first vertical line perpendicular to the reference axis, and allocating the target importance level to each of the indices positioned along a second vertical line moved parallel in a direction of the reference axis by a predetermined distance after allocating the target importance level to all of the indices positioned along the first vertical line, the process being executed on the indices, the number of which corresponds to the use index number of the target importance level.

(Addition 4)

The monitoring status display device according to any one of the additional notes 1 to 3, wherein the display mode determination means determines the display mode of each of the indices based on a highest alert level out of alert levels of the monitoring subjects allocated by the monitoring subject allocation means.

(Addition 5)

The monitoring status display device according to any one of the additional notes 1 to 4, wherein the use index number determination means determines the use index numbers such that at least one index is allocated according to the importance levels.

(Addition 6)

The monitoring status display device according to any one of the additional notes 1 to 5, wherein when sources of the plurality of monitoring subjects with the same importance level are the same as one another based on a condition that each alert level satisfies a predetermined condition, the monitoring subject allocation means allocates the plurality of monitoring subjects to the same index, and, when sources of the plurality of monitoring subjects are the same as one another, allocates the plurality of monitoring subjects to different indices.

(Addition 7)

The monitoring status display device according to any one of the additional notes 1 to 6, further comprising monitoring subject information storage means for storing related information on each of the monitoring subjects, wherein, when a user designates any of the indices displayed on the predetermined display region, the display control means identifies, from the monitoring subject information storage means, the related information on the monitoring subject allocated to the designated index and displays a list of the identified related information.

(Addition 8)

The monitoring status display device according to the additional note 7, wherein when the monitoring subject allocated to the designated index exceeds a prescribed number, the display control means allocates the monitoring subject to a plurality of indices, determines the display modes of the plurality of indices based on the alert level of the monitoring subject, and displays the plurality of indices on the predetermined display region in accordance with the determined display modes.

(Addition 9)

The monitoring status display device according to any one of the additional notes 1 to 8, wherein the display control means determines the display mode of each of the indices based on the alert levels and importance levels of the monitoring subjects allocated to the indices.

(Addition 10)

A monitoring status display method used in the monitoring status display device, the monitoring status display method comprising: a use index number determination step of, when displaying an arrangement of a plurality of indices representing a plurality of monitoring subjects in a predetermined display region, determining use index numbers that can be used with respect to importance levels set for the plurality of monitoring subjects, based on a ratio of the importance levels and a total number of the plurality of indices; an importance level allocation step of determining an index that is to be allocated to each of the importance levels, based on the arrangement of the plurality of indices and the use index numbers set for the respective importance levels, in a manner that indices with the same importance level are disposed close to each other; a monitoring subject allocation step of allocating, substantially evenly to the indices, the monitoring subjects having an importance level same as that of the indices; a display mode determination step of determining a display mode for displaying each of the indices, based on an alert level of each of the monitoring subjects allocated to the indices; and a display control step of displaying the indices on the predetermined display region in accordance with the determined display modes.

(Addition 11)

The monitoring status display method according to the additional note 10, further comprising a monitoring data acquisition step of acquiring monitoring data of each of the plurality of monitoring subjects, and an alert level determination step of determining an alert level of each of the monitoring subjects on the basis of contents of the monitoring data.

(Addition 12)

The monitoring status display method according to the additional note 1 or 2, wherein the importance level allocation step determines the index to be allocated to each of the importance levels, by executing a process of allocating the importance level to each of the indices positioned along a vertical line that is perpendicular to a reference axis set on the predetermined display region, and allocating the importance level to each of the indices positioned along a vertical line moved parallel in a direction of the reference axis by a predetermined distance, when there exist no indices along the vertical line perpendicular to the reference axis, until determining the indices with respect to the importance levels, the number of indices corresponding to the use index number.

(Addition 13)

The monitoring status display method according to any one of the additional notes 10 to 12, wherein the display mode determination step determines the display mode of each of the indices based on a highest alert level out of the alert levels of the monitoring subjects allocated in the monitoring subject allocation step.

(Addition 14)

The monitoring status display method according to any one of the additional notes 10 to 13, wherein the use index number determination step determines the use index numbers such that at least one index is allocated to each of the importance levels.

(Addition 15)

The monitoring status display method according to any one of the additional notes 10 to 14, wherein when the plurality of monitoring subjects with the same importance level has the same resource based on a condition that each alert level satisfies a predetermined condition, the monitoring subject allocation step allocates the plurality of monitoring subjects to the same index, and, when the plurality of monitoring subjects do not have the same resource, allocates the plurality of monitoring subjects to different indices.

(Addition 16)

The monitoring status display method according to any one of the additional notes 10 to 15, wherein when a user designates any of the indices displayed on the predetermined display region, the display control step identifies, from a monitoring subject information storage device for storing related information on each of the monitoring subjects, the related information on the monitoring subject allocated to the designated index and displays a list of the identified related information.

(Addition 17)

The monitoring status display method according to the additional note 16, wherein when the monitoring subject allocated to the designated index exceeds a prescribed number, the display control step allocates the monitoring subject to a plurality of indices, determines the display modes of the plurality of indices based on the alert level of the monitoring subject, and displays the plurality of indices on the predetermined display region in accordance with the determined display modes.

(Addition 18)

The monitoring status display method according to any one of the additional notes 10 to 17, wherein the display control step determines the display mode of each of the indices based on the alert levels and importance levels of the monitoring subjects allocated to the indices.

(Addition 19)

A program for causing a computer to execute each of the steps described in any one of the additional notes 10 to 18.

This application claims priority to Japanese Patent Application No. 2010-43177 filed on Feb. 26, 2010, the contents of which are hereby incorporated by reference into the present application.

The above has described the present invention with reference to the embodiments; however, the present invention is not limited to these embodiments. The configurations and details of the present invention can be changed in various ways within the scope of the present invention as would be appreciated by those skilled in the art.

The monitoring status display device, method, and program according to the present invention can achieve prompt and reliable identification of problems in a system, even when there exist a large number of monitoring subjects.

1 Monitoring status display device
11 Data acquisition unit
12 Importance level determination unit
13 Use index number determination unit
14 Importance level allocation unit
15 Monitoring subject allocation unit
16 Display mode determination unit
17 Display control unit
20 Storage device
30 Input device
40 Display

I claim:

1. A monitoring status display device, comprising:
use index number determination unit for, when displaying an arrangement of a plurality of indices representing a plurality of monitoring subjects in a predetermined display region, determining use index numbers that can be used with respect to importance levels set for the plurality of monitoring subjects, based on a ratio of the importance levels which are used when monitoring the monitoring subjects and are a ratio of the region to which the monitoring subjects belong and a total number of the plurality of indices;
importance level allocation unit for determining an index to be allocated to each of the importance levels, based on the arrangement of the plurality of indices and the use index numbers set for the respective importance levels, in a manner that indices with the same importance level are disposed close to each other;
monitoring subject allocation unit for allocating, substantially evenly to the indices, the monitoring subjects having an importance level same as that of the indices;
display mode determination unit for determining a display mode for displaying each of the indices, based on an alert level of each of the monitoring subjects allocated to the indices; and
display control unit for displaying the indices on the predetermined display region in accordance with the determined display modes, wherein
the use index number determination unit, the importance level allocation unit, the monitoring subject allocation unit, the display mode determination unit and the display control unit are configured by a CPU, a memory, an input device and a display.

2. The monitoring status display device according to claim 1, further comprising:
monitoring data acquisition unit for acquiring monitoring data on each of the plurality of monitoring subjects; and
alert level determination unit for determining an alert level of each of the monitoring subjects on the basis of contents of the monitoring data, wherein
the monitoring data acquisition unit and the alert level determination unit are configured by the CPU, the memory, the input device and the display.

3. The monitoring status display device according to claim 1, wherein the importance level allocation unit determines the index to be allocated to each of the importance levels, by executing a process of allocating the importance level to each of the indices positioned along a vertical line that is perpendicular to a reference axis set on the predetermined display region, and allocating the importance level to each of the indices positioned along a vertical line moved parallel in a direction of the reference axis by a predetermined distance, when there exist no indices along the vertical line perpendicular to the reference axis, until determining the indices with respect to the importance levels, with the number of these indices corresponding to the use index number.

4. The monitoring status display device according to claim 1, wherein the display mode determination unit determines the display mode of each of the indices based on a highest alert level out of alert levels of the monitoring subjects allocated by the monitoring subject allocation unit.

5. The monitoring status display device according to claim 1, wherein the use index numbers determination unit determines the use index number such that at least one index is allocated according to the importance levels.

6. The monitoring status display device according to claim 1, wherein when resources of the plurality of monitoring subjects with the same importance level are the same as one another based on a condition that each alert level satisfies a predetermined condition, the monitoring subject allocation unit allocates the plurality of monitoring subjects to the same index, and, when resources of the plurality of monitoring subjects are not the same as one another, allocates the plurality of monitoring subjects to different indices.

7. The monitoring status display device according to claim 1, further comprising:
monitoring subject information storage unit for storing related information on each of the monitoring subjects, wherein, when a user designates any of the indices displayed on the predetermined display region, the display control unit identifies, from the monitoring subject information storage unit, the related information on the monitoring subjects allocated to the designated index and displays a list of the identified related information, wherein
the monitoring subject information storage unit is configured by the CPU, the memory, the input device and the display.

8. A monitoring status display method used in a monitoring status display device, the monitoring status display method comprising:
a use index number determination step of, when displaying an arrangement of a plurality of indices representing a plurality of monitoring subjects in a predetermined display region, determining use index numbers that can be used with respect to importance levels which are used when monitoring the monitoring subjects and are set for the plurality of monitoring subjects, based on a ratio of the importance levels which are a ratio of the region to which the monitoring subjects belong and a total number of the plurality of indices;

an importance level allocation step of determining an index that is to be allocated to each of the importance levels, based on the arrangement of the plurality of indices and the use index numbers set for the respective importance levels, in a manner that indices with the same importance level are disposed close to each other;

a monitoring subject allocation step of allocating, substantially evenly to the indices, the monitoring subjects having an importance level same as that of the indices;

a display mode determination step of determining a display mode for displaying each of the indices, based on an alert level of each of the monitoring subjects allocated to the indices; and a display control step of displaying the indices on the predetermined display region in accordance with the determined display modes.

9. A non-transitory computer readable medium for causing a computer to execute each of the steps described in claim 8.

* * * * *